(12) United States Patent
Saito et al.

(10) Patent No.: US 8,358,637 B2
(45) Date of Patent: Jan. 22, 2013

(54) LOAD BALANCING METHOD FOR MOBILE COMMUNICATION SYSTEM, BASE STATION AND TERMINAL

(75) Inventors: Toshiyuki Saito, Kokubunji (JP); Kiyoshi Kawamoto, Yokohama (JP); Mikio Kuwahara, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 1382 days.

(21) Appl. No.: 11/808,336

(22) Filed: Jun. 8, 2007

(65) Prior Publication Data

US 2007/0297380 A1    Dec. 27, 2007

(30) Foreign Application Priority Data

Jun. 23, 2006  (JP) ................................. 2006-173289

(51) Int. Cl.
*H04B 7/26* (2006.01)
(52) U.S. Cl. ........ 370/338; 370/328; 370/329; 370/342; 455/422; 455/445; 455/560
(58) Field of Classification Search .................. 370/338, 370/328–329, 342; 455/445, 422, 560
See application file for complete search history.

(56) References Cited

U.S. PATENT DOCUMENTS

| 7,787,416 | B2 * | 8/2010 | Gidwani | 370/329 |
| 2005/0053046 | A1 * | 3/2005 | Wang | 370/338 |
| 2006/0072502 | A1 | 4/2006 | Crandall et al. | |
| 2006/0072533 | A1 * | 4/2006 | Smee et al. | 370/342 |

FOREIGN PATENT DOCUMENTS

| JP | 2003-519957 | 6/2003 |
| JP | 2003-259463 | 9/2003 |
| JP | 2008-512063 | 7/2008 |
| WO | WO01/50638 A1 | 7/2001 |
| WO | WO2006/026679 A1 | 3/2006 |

OTHER PUBLICATIONS

"cdma2000 High Rate Packet Data Air Interface Specification", 3rd Generation Partnership Project 2 "3GPP2", 3GPP2 C.S0024-A, Version 2.0, Jul. 2005, 10-141-10-1413.
Notice of Reason of Rejection from the Korean Patent Office dated Jan. 18, 2011, in Korean with partial English translation.

\* cited by examiner

*Primary Examiner* — Kiet Doan
*Assistant Examiner* — Michael T Vu
(74) *Attorney, Agent, or Firm* — Stites & Harbison, PLLC; Juan Carlos A. Marquez, Esq

(57) ABSTRACT

A method for preventing or correcting the imbalance in load among interlaces in communications based on CDMA whereby communication resources are allocated to the respective interlaces through an interlacing scheme. A base station measures load information on an interlace-by-interlace basis, and notifies the same to a terminal while the terminal filters the load information to utilize the same for making a decision on transmission timing. Or the base station notifies the terminal of load information on plural transmission timings, and the terminal selects an adequate transmission timing to be then utilized. Otherwise, the base station presents at least two probabilities of transition between interlaces, urging the terminal to update an interlace (transmission timing) on a probabilistic basis.

11 Claims, 11 Drawing Sheets

LOAD BALANCING METHOD FOR MOBILE COMMUNICATION SYSTEM, BASE STATION AND TERMINAL

CLAIM OF PRIORITY

The present application claims priority from Japanese application JP 2006-173289 filed on Jun. 23, 2006, the content of which is hereby incorporated by reference into this application.

FIELD OF THE INVENTION

The invention relates to a load balancing method employed at a base station apparatus for cellular wireless communications, and in particular, to a load balancing method to provide a service in quest for low jitter, such as VoIP in a packet type best effort system represented by CDMA2000 1x EVD0.

BACKGROUND OF THE INVENTION

The load balancing method is described hereinafter by taking an example of 1xEVD0. With 1xEVD0, a terminal is controlled according to a probability transition model. The terminal generates a random number at adequate timing, and the value of the random number is compared with a predetermined threshold, whereupon if a specified condition is met, a transmission rate is updated. The transmission rate is controlled according to a probabilistic process by such an operation as described, thereby preventing occurrence of abrupt variations in the transmission rate. If the abrupt variations occur in the transmission rate, this will disable the terminal from properly controlling transmit power, thereby rendering the terminal uncontrollable. With this in mind, there has been introduced autonomous decentralized control employing probability. The rate is normally controlled in an upward direction. When the rates at respective terminals become higher, transmit power as required increases, so that there occurs an increase in signal reception power on the part of a base station. If there occurs excessive competition to increase the transmit power, terminals on respective boundaries of cells will come to have the transmit power constantly at the maximum level, thereby rendering the terminals unable to obtain desired characteristics, so that it is necessary to suppress the transmit power at an adequate level. For example, according to Evaluation Methodology of 3GPP2, it is stipulated that evaluation on capacity be carried out on a condition that a probability of RoT (Rise over Thermal) exceeding 7 dB is less than 1%. An actual system is operated based on such an upper limit as above. When the signal reception power at the base station reaches such a standard as described, a base station apparatus sets a bit called RAB (Reverse Activity Bit) to "1". The RAB is worked out based on information such as the signal reception power of the base station, or RSSI (the total signal reception power of the base station apparatus), and so forth. When RoT or an observed value equivalent thereto reaches a specified value, or higher, the base station sets the bit to "1". Accordingly, the RAB is control information indicating that the signal reception power has reached a specified value. The terminal stops increasing the rate upon detection of the RAB being set to "1", and conversely, executes control so as to lower the rate with the use of control employing a random number. Since the RAB is transmitted according to instantaneous signal reception power of the base station, control is executed such that a system condition is held in the vicinity of the boundaries where the RAB is set to "1". The RAB is generated based on instantaneous values of measurement results, however, there has been no stipulation concerning interlace transition to be described later in the present description.

[Non-Patent Document 1]

Standardization Literature: 3GPP2 C. S0024-A v2.0 "CDMA 2000 High Rate Packet Data Air Interface Specification (2005/07) pp. 10-141 to 10-143

SUMMARY OF THE INVENTION

Since the CDMA system is capable of concurrently accommodating a multitude of users due to effects of code spreading, it has been developed as a cellular system of the third generation. A packet type best effort system represented by 1xEVDD, and HSDPA has lately come to attract attention, and with the assistance of development of the IP Telephony, VoIP over cellular is now under study. With such a system, in combination with H-ARQ (Automatic Retransmission reQuest), a wireless frame is commonly divided into a finite number of interlaces, as shown in FIG. 1 (in the figure, timing #1 to 3 each correspond to an interlace). With H-ARQ, when a sender executes transmission, a receiver determines whether or not received information has been received without an error by means of FEC (Frame Error check), returning a signal of ACK/NACK to the sender according to the result of such determination. When ACK is sent back, the sender recognizes that transmitted information has been correctly sent out, and executes transmission of new information. If NACK is sent back, the sender recognizes that the transmitted information has not correctly been received, and executes retransmission of the information. Since it takes time to make the determination by FEC, as described, and to transmit or receive ACK/NACK, the concept of interlacing (transmission timing) becomes essential.

In the case where a service with packets thrown therein at given intervals, such as VoIP (Voice over IP), is applied to the system described as above, if interlaces are used in a staggered fashion like the case of TDMA, there will occur no interference among the interlaces. FIG. 1 shows the case of Ev-D0 Rev. A, where the number of interlaces is three.

Since stability of the CDMA system is dependent on the maximum value of the signal reception power of the base station, it is desirable to even out loads among the interlaces in order to increase the number of users who can be accommodated. However, because the respective terminals independently execute interlace selection, there can occur a case where users converge on a specific interlace as shown in FIG. 2, thereby rendering loads uneven among the interlaces unless particular control is applied. Such a case can also occur when a specific user moves toward another base station by a handover while making a cell phone conversation. Further, with CDMA, signal reception power per bit, on the part of the base station, is substantially normalized by control of the transmit power at the terminal, so that imbalance in load by the interlace can occur in the case of a specific user wanting to do wide-band communicating, and it is therefore impossible to manage interlacing through simple control of the number of users alone. Accordingly, under the present circumstances, there is not available any technology whereby load decentralization in a direction along time is taken into account. If means for correcting the imbalance in load among the interlaces are found, overall enhancement in the number of the users accommodated by the system can be hoped for.

It is an object of the invention to provide a scheme whereby the load decentralization in the direction along time is executed in the CDMA system. Load information notified by a base station is filtered at a terminal, and is used for making a decision on transmission timing. Or a base station notifies load information on plural transmission timings, and a terminal selects adequate transmission timing to be used. Otherwise, a base station presents at least two or more transition probabilities, urging a terminal to update an interlace (transmission timing) on a probabilistic basis.

The above problem can be resolved by a first load balancing method of a wireless communications system of code multiplex, for decentralizing periodical communication loads by time division multiplex, characterized in that a terminal adjusts transmission timing based on information on a traffic congestion state, of which a base station notifies the terminal.

Further, the above problem can be resolved by a second load balancing method according to the first load balancing method, characterized in that the transmission timing may be adjusted at the start of a new service, at the start of communication during the service, or in the middle of the communication.

Still further, the above problem can be resolved by a third load balancing method according to the second load balancing method, characterized in that autonomous decentralized control of loads may be implemented by adjusting the transmission timing based on a predetermined probability.

Yet further, the above problem can be resolved by a fourth load balancing method according to the third load balancing method, characterized in that another probability may be used for at least any one or more cases of the start of a new service, the start of communication during the service, and the middle of the communication.

Further, the above problem can be resolved by a fifth load balancing method of a wireless communications system of code multiplex, for decentralizing periodical communication loads by time division multiplex, characterized in that a terminal adjusts transmission timings based on information on traffic congestion states concerning at least two or more timings, of which a base station notifies the terminal.

Still further, the above problem can be resolved by a sixth load balancing method according to the fifth load balancing method, characterized in that the transmission timing may be adjusted at the start of a new service, at the start of communication during the service, or in the middle of the communication.

Yet further, the above problem can be resolved by a seventh load balancing method according to the sixth load balancing method, characterized in that autonomous decentralized control of loads may be implemented by adjusting the transmission timing based on a predetermined probability.

Further, the above problem can be resolved by an eighth load balancing method according to the seventh load balancing method, characterized in that another probability may be used for at least any one or more cases of the start of a new service, the start of communication during the service, and the middle of the communication.

Furthermore, the above problem can be resolved by a first base station apparatus capable of executing a code multiplex wireless communication for decentralizing periodical communication loads by time division multiplex, said base station apparatus which includes a traffic measuring means for measuring a traffic state at respective timings of a received signal, subjected to time division multiplex, a terminal control information generation means for generating information on a traffic congestion state based on results of measurement by the traffic measuring means, a terminal control information transmission means for transmitting information generated by the terminal control information generation means to a terminal.

Further, the above problem can be resolved by a second base station apparatus according to the first base station apparatus, characterized in that a transition probability for changing transmission timing decided by the terminal or a control value for use in controlling the transition probability may be transmitted.

Still further, the above problem can be resolved by the second base station apparatus, characterized in that the transition probability for changing the transmission timing decided by the terminal or the control value for use in controlling the transition probability may vary in at least one or more cases including the start of a new service, the start of communication during the service, and the middle of the communication, and varying parameters may be transmitted to the terminal.

Yet further, the above problem can be resolved by a first terminal which includes a transmission timing adjusting means, characterized in that transmission timing of a packet is adjusted based on information on a traffic congestion state, notified by a base station apparatus.

Further, the above problem can be resolved by a second terminal according to the first terminal, characterized in that the transmission timing may be adjusted at the start of a new service, at the start of communication during the service, or in the middle of the communication.

Still further, the above problem can be resolved by a third terminal according to the first terminal, characterized in that autonomous decentralized control of loads may be implemented by adjusting the transmission timing based on a predetermined probability.

Yet further, the above problem can be resolved by a fourth terminal according to the first terminal, characterized in that information on traffic congestion states concerning at least two or more timings, sent out from a base station, is received, and transmission timings may be adjusted on the basis of the information.

With the invention, load decentralization in the direction along time, uncontrollable in the past, can be implemented. As a result, system stability in terms of power is enhanced, and a greater number of users can be stably accommodated by the system.

DETAILED DESCRIPTION OF THE PREFERRED EMBODIMENTS

First Embodiment

Figure 3:
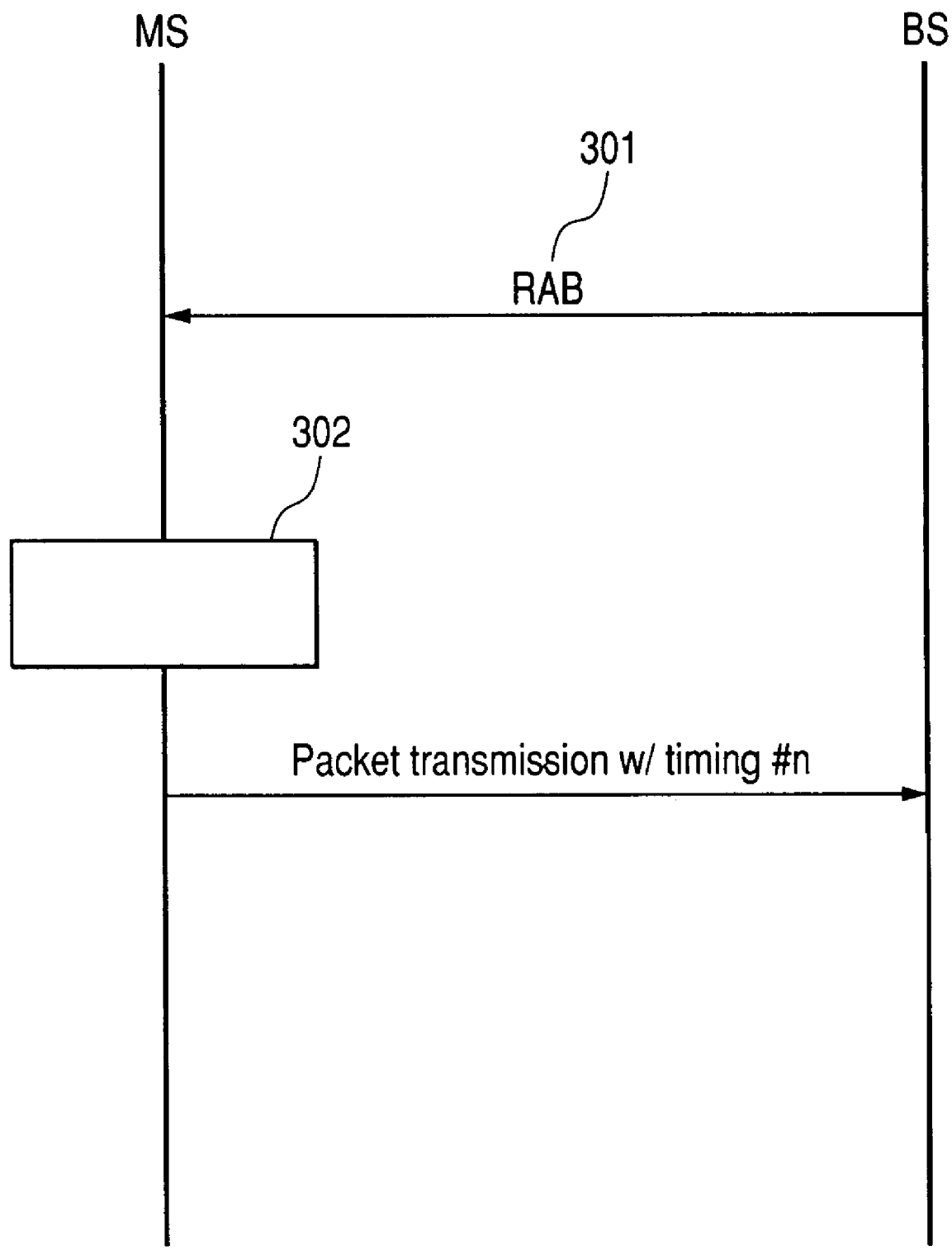
FIG. 3 is a diagram showing control sequence of a load balancing method according to a first embodiment of the invention.

In FIG. 3, there is shown control sequence of a load balancing method according to a first embodiment of the invention. FIG. 3 shows Reverse Activity Bit (RAB) of EV-D0 by way of example. A base station examines a load in terms of power on a given time basis, and notifies a terminal of load information (RAB) 301. RAB is worked out based on information such as signal reception power of the base station, or RSSI, and so forth, and the base station sets the bit to "1" if RoT (Rise over Thermal), or an observed value equivalent thereto has reached a specified value, or higher. Accordingly, it can be said that the RAB is control information indicating that the signal reception power has reached a specified value. When the terminal detects by observation that the RAB is set to "1", the terminal stops increasing a transmission rate, and conversely, executes control to lower the rate with the use of control employing a random number. Since the RAB is transmitted according to instantaneous signal reception power of the base station, if RoT exceeds a threshold, the RAB is turned to "1", thereby acting so as to check an increase in the signal reception power, and conversely, if RAB is "0", respective terminals gradually increase the rate, controlling the rate such that RoT is increased. As a result, the signal reception power of the base station is controlled so as to be in the vicinity of the boundary of a region where the RAB is at "1". However, for example, in the case where the number of the terminals is a few, and RoT is not reached even though all the terminals in the middle of communication have reached the maximum rate as permitted, there results a situation where the RAB remains at "0". Particularly when all the terminals are users of VoIP, the upper limit of the transmission rate is at a relatively low value on the order of several tens of kb/s, so that all the terminals are in equilibrium with each other at the value of the upper limit where transition of the transmission rate takes place, and there occurs a situation where the RAB is not turned to "1."

The RAB is generated based on instantaneous values of the measurement results, however, there has been no stipulation concerning interlace transition to be described later in the present description. In the case of 1x EVD0, with the terminal, a sub-frame is made up on a 4-slots basis, and a unit of the sub-frame corresponds to an interlace unit. Meanwhile, as the RAB is information to be updated on a slot basis, it is possible to approximately estimate which interlace is in congested state by observation of continuous RABs. Based on results of such estimation, the terminal is able to look for an interlace where the RAB is unlikely to be turned to "1", thereby allocating a packet thereto. Accordingly, in a step 302 in FIG. 3, the terminal observes the continuous RABs, executing packet transmission in the sub-frame (interlace) where the RAB is unlikely to be turned to "1". With the CDMA system such as 1x EVD0, since the terminal has negotiated with the base station prior to the start of data communications such that use is made of spreading codes that differ from each other on a terminal-by-terminal basis, there is no possibility that any of the codes will bump against others of the codes whichever interlace is in use. Nevertheless, if selection is made on an interlace where the others of the codes are fewer in number, more efficient communication can be implemented.

Methods for observing the continuous RABs include, for example, the following method. More specifically, the terminal desirous of starting the service shifts notified information 301 on an interlace-by-interlace basis so as to be evened out among the interlaces. By so doing, the terminal estimates an average load of the respective interlaces (302), and starts sending out a packet to an interlace with a load estimated as low.

Figure 4:
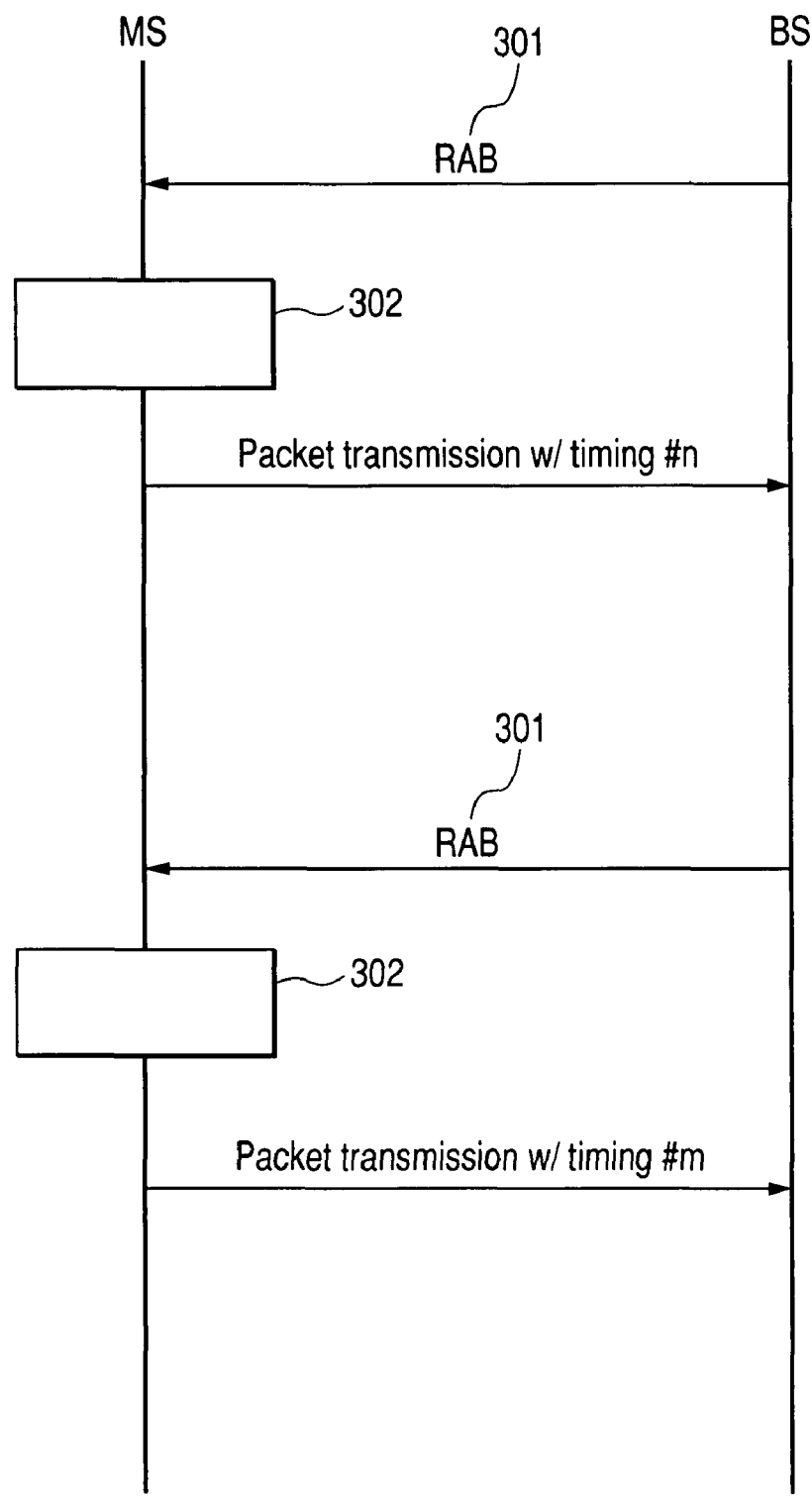
FIG. 4 is a diagram showing control sequence of the load balancing method according to the first embodiment, for controlling a terminal even after the start of a service.

As a case falling within the scope of the present embodiment, observation on the RABs may be continued even while packets are being transmitted as shown in FIG. 4, and if an interlace lower in load than an interlace presently in use for communication is found based on results of measurement on the RABs, a change may be made such that a packet is transmitted to the interlace lower in load. The base station always makes predictions about a possibility of a packet coming to any of all the interlaces, and keeps standing by, so that even if a terminal on its own decision changes an interlace to which a packet is transmitted without any particular reporting, the base station is capable of correctly receiving the packet.

Figure 8:
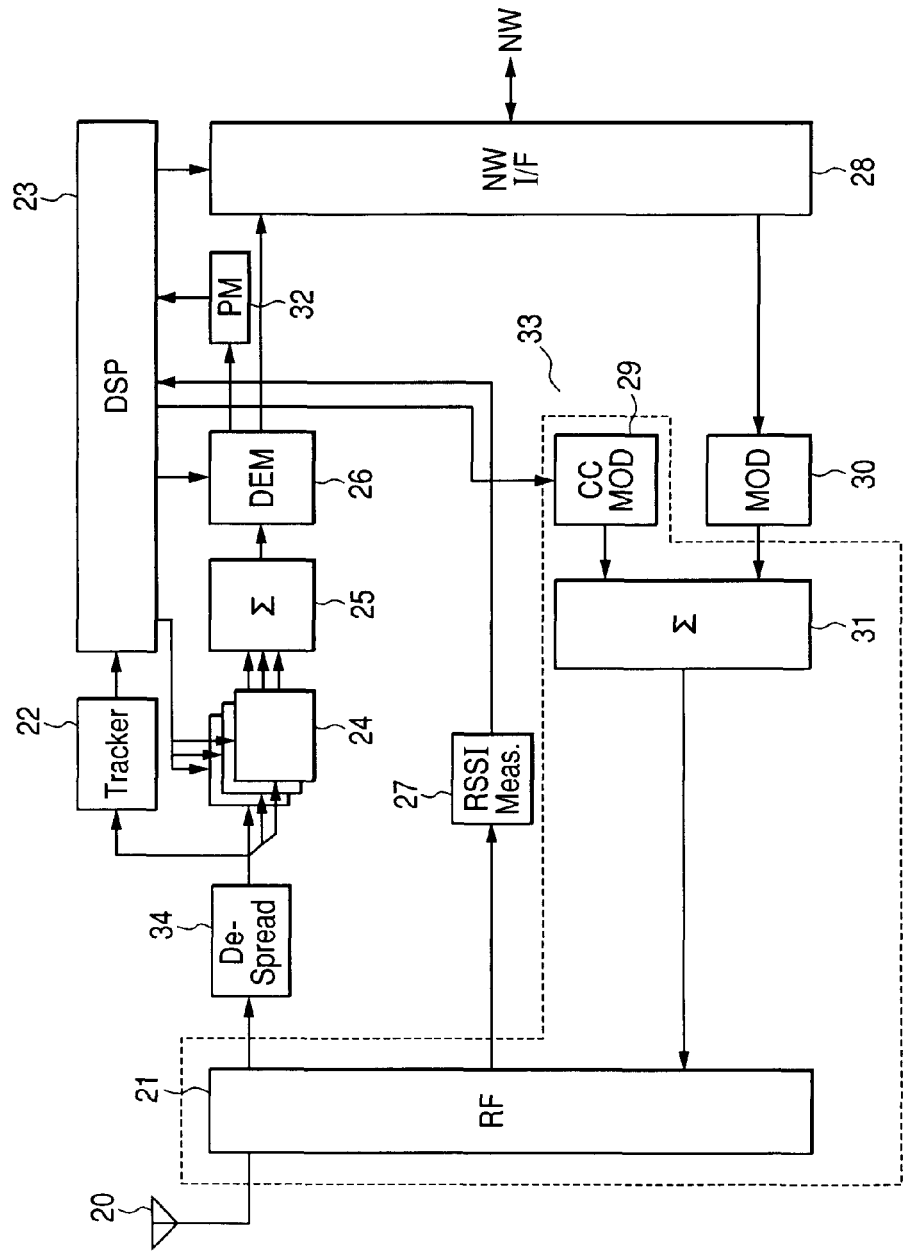
FIG. 8 is a block diagram of a base station apparatus for the load balancing method according to the first embodiment of the invention.

FIG. 8 shows a configuration of the base station apparatus for outputting RABs. The base station apparatus generates RAB by keeping track of a state of an up-link, and transmits the same by use of a down-link. First, description is given in respect of keeping track of the state of the up-link. In FIG. 8, a signal received by an antenna 20 has its frequency to be converted into a baseband frequency by an RF unit (21), and is thereby converted into a digital signal. The digital signal as converted is separated into receive signals on a terminal-by-terminal basis by a de-spreading processor (34), and a tracker (22) takes measurements on arrival timing and intensity of the signal by making use of a matched filter or the like. Information on the arrival timing and intensity of the signal is inputted to a signal processor DSP (23), whereupon the information is allocated to hardware resources such as fingers, and so forth. A finger processor (24) executes signal processing at desired pass delay according to a directive from the signal processor DSP (23). Results of the signal processing are inputted to an addition processor (25), whereupon the signals are added up, thereby completing RAKE-receiving. A signal as RAKE-received is inputted to a demodulator (26) where demodulation is executed. At this point in time, it is possible to take measurements on a pilot signal and SINR, and information blocks on signal and power, obtained for all the terminals, are added up at a power measurement unit (32) to be outputted as power information such as RoT, and so forth. Subsequently, a method for transmitting control information is described hereinafter. When RoT is obtained, the signal processor (23) inputs RoT to a control channel modulator (29) in the down-link, whereupon RAB is generated. Control information generated is added to an output of a modulator (30) for generating coded information of user information from a network by use of a multiplexing means such as time division multiplex, or code multiplex and so forth at an adder (31). A signal after addition is fed to the RF unit so as to be transmitted as a wireless signal from the antenna 20. Further, in the case of retransmission, a demodulated signal is synthesized with data already received in the same interlace before subjected to decoding processing by the DSP (23), and the results (ACK/NACK) of such processing are multiplexed with other information of a control channel transmitter (33) to be then transmitted. A correctly decoded signal is sent out to a network via a network interface (28).

With the present embodiment described as above, use is made of a demodulated signal for determination on RoT, however, for the same purpose, measurement on RSSI may be made. In FIG. 8, results of the measurement by a RSSI measurement unit (27) are inputted to the signal processor DSP (23), thereby taking measurement of signal reception power. Further, with embodiments 2, and 3, the control channel transmitter (33) multiplexes RAB with load information at another transmission timing before transmission.

Figure 10:
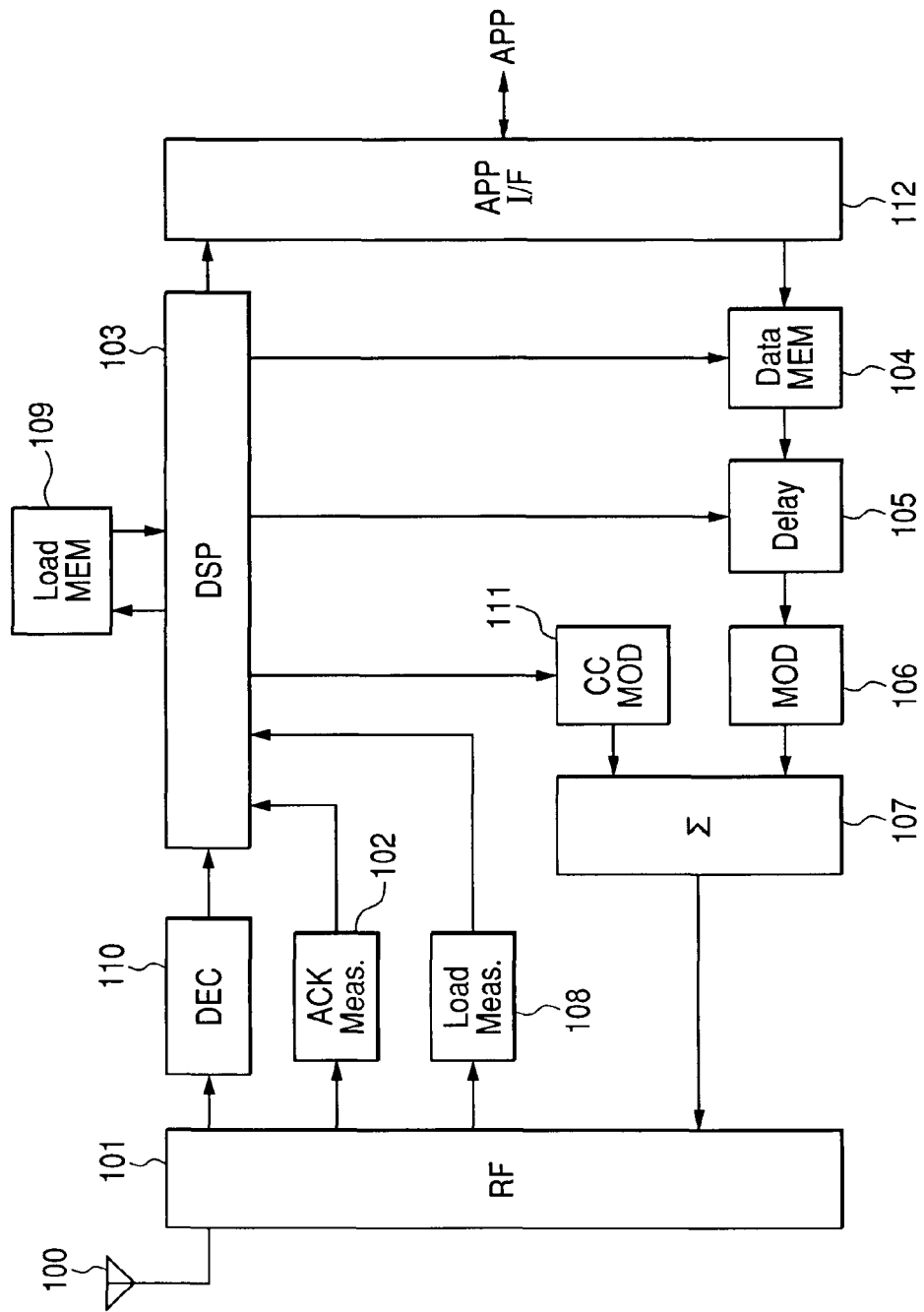
FIG. 10 is a block diagram of a terminal for the load balancing method according to the first embodiment of the invention.

FIG. 10 shows a configuration of the terminal according to the present embodiment. The terminal executes a data-transmit operation including retransmission, and keeps track of a load state at the base station on an interlace-by-interlace basis based on RAB information notified by the base station, thereby changing transmission timing to an interlace low in load at the base station. First, there is described hereinafter how to keep track of the load state by the interlace. In FIG. 10, a signal received by an antenna (100) has its frequency to be converted into a baseband frequency by an RF unit (101), and is thereby converted into a digital signal. A load information measurement unit (108) detects the RAB information out of the digital signal as converted, and a signal processor DSP (103) updates load information stored in a load information memory (109), on an interlace-by-interlace basis. After updating, if the signal processor DSP (103) determines that there exists an interlace indicating load information lower in load than that of an interlace presently in use, the signal processor DSP (103) activates a delay device (105) in order to change transmission timing. An operation for changing the transmission timing may be executed either after the start of communication or in the middle of communication. The operation, in the middle of communication, may be controlled so as not to change the timing during an operation for retransmission, to be described later in the present description.

Subsequently, data transmission is described hereinafter. In the case where data transmission on the previous occasion has been executed by use of the interlace, the base station has already transmitted an ACK information indicating whether signal reception has been the success or failure, which is detected by an ACK information determining unit (102), whereupon the signal processor DSP (103) determines whether or not retransmission is required. The data transmitted on the previous occasion, together with newly transmitted data obtained via an application interface (112), has been stored in a transmitted data holding buffer (104), which outputs retransmission data when it is determined that retransmission is required while outputting the newly transmitted data when it is determined that retransmission is not required. Data outputted is inputted to a modulator (106) via the delay device (105) and is multiplexed with data information (either the retransmission data or the new data) generated by a control channel generation•modulation unit (111) is at an adder (107). A multiplexed signal is fed to the RF unit (101) to be then outputted as a wireless signal from the antenna (100). Finally, data reception is described hereinafter. Transmitted data from the base station, outputted from the RF unit, is decoded by a decoder (110) to be subsequently inputted to the signal processor DSP (103). The signal processor DSP (103) inputs the success or the failure of decoding to the control channel generation•modulation unit (111), whereupon the success or the failure of decoding is multiplexed with other control information. The data is concurrently outputted to an application via the application interface (112) in the case of successful decoding.

Since the terminal decides as described in the foregoing based on the RAB information transmitted by the base station, and is capable of starting transmission after selecting an interlace with a low load, load decentralization can be autonomously executed on an interlace-by-interlace basis, so that control can be effected such that a capacity of the system is maximized. Hence, the problem described is resolved.

Second Embodiment

Figure 5:
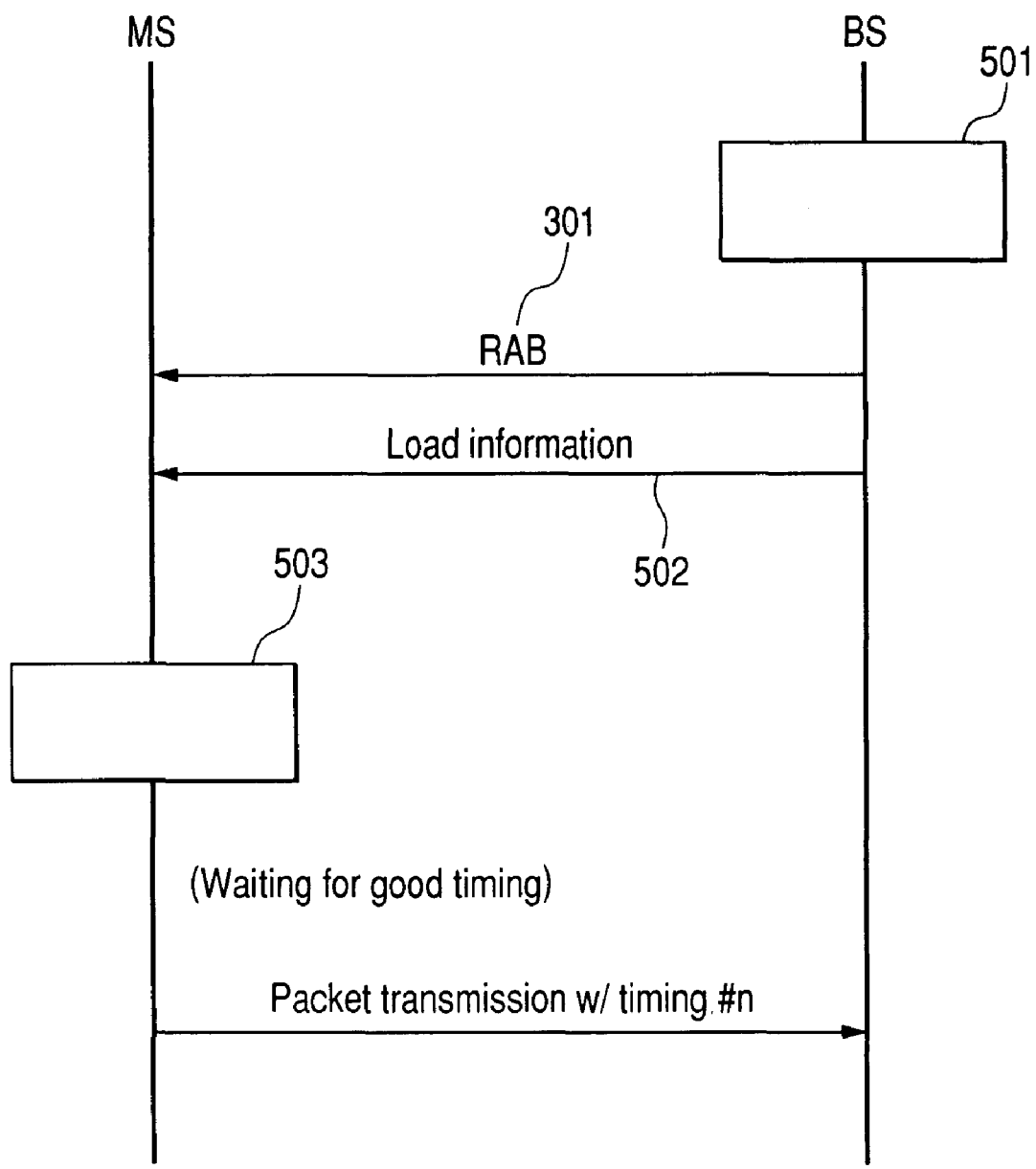
FIG. 5 is a diagram showing control sequence of a load balancing method according to a second embodiment of the invention.
Figure 6:
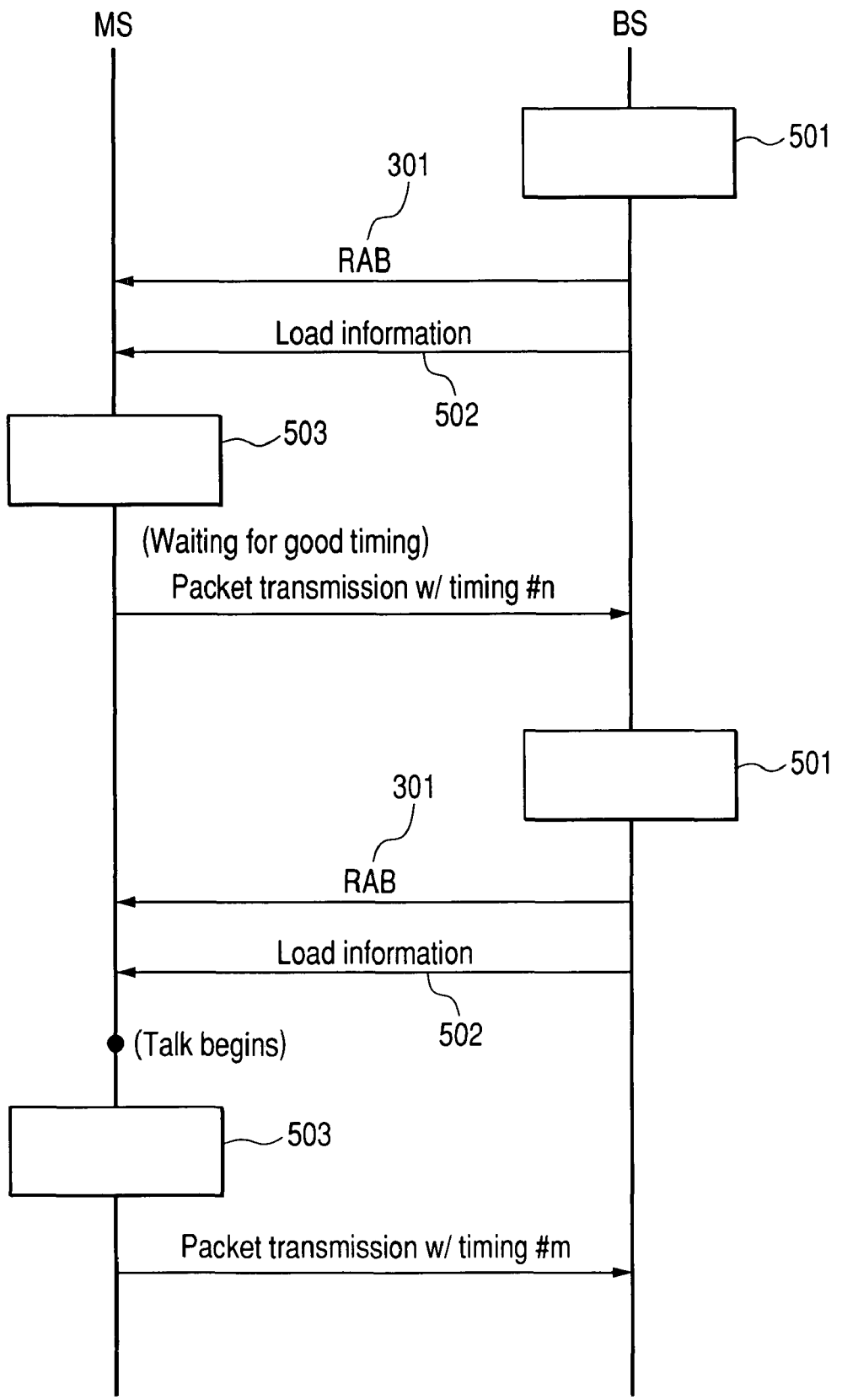
FIG. 6 is a diagram showing control sequence of the load balancing method according to the second embodiment, for controlling a terminal even after the start of a service.

In FIG. 5, there is shown control sequence of a load balancing method according to a second embodiment of the invention. A base station examines (501) load information at another timing in addition to the load information (301) at that timing, and notifies (502) the same to a terminal. If the RAB 301 indicates that a relevant interlace is low in load, a terminal desirous of starting communication starts communication at that timing (interlace), and if the RAB 301 indicates that the relevant interlace is high in load, and notified information 502 indicates that there exists another timing (interlace) low in load, the terminal holds starting of data transmission until arrival of that timing. Further, as shown in FIG. 6, observation on the RAB 301, and the notified information 502 may be continued even while packets are being transmitted, and when it is determined based on measurement results that there exists an interlace lower in load than an interlace presently in use for communication, transmission timing may be shifted such that a packet is transmitted to the interlace lower in load. In FIG. 6, there is described the case where an opportunity of a start in talking is taken advantage of, however, this may be changed to another opportunity. The base station always estimates the possibility of a packet coming to any of all the interlaces, and keeps standing by, so that even if the terminal on its own judgment changes the interlace to which a packet is transmitted without any particular reporting, the base station is capable of correctly receiving the packet.

Figure 1:
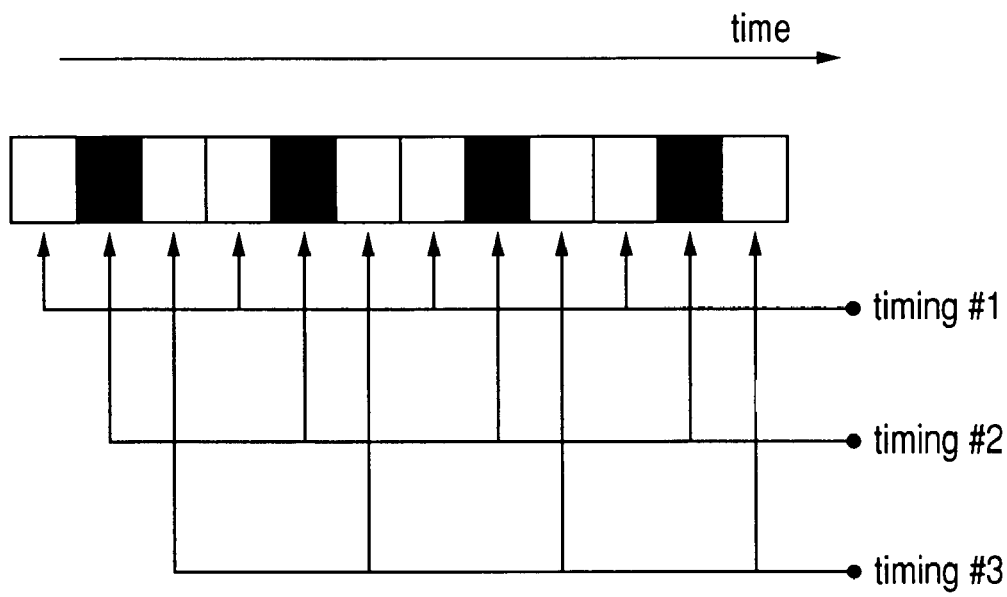
FIG. 1 is a schematic view showing transmission timings (interlaces)
Figure 2:
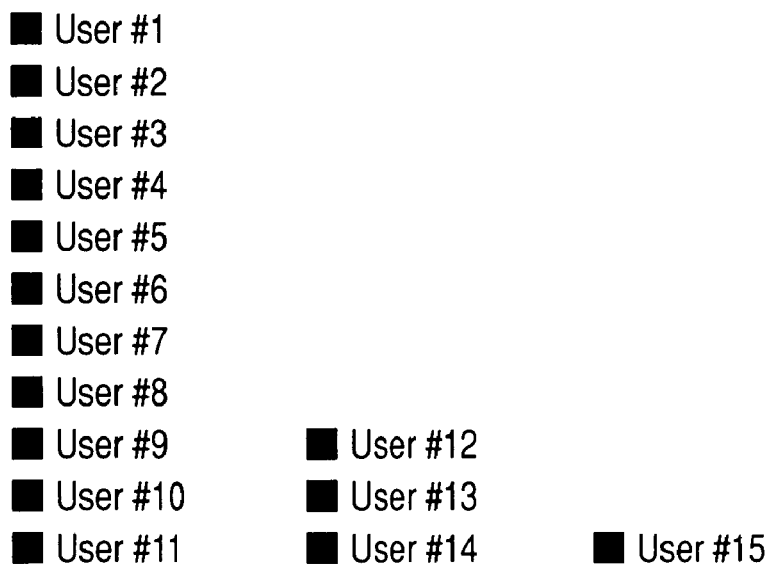
FIG. 2 is a schematic view showing convergence of loads at a specific timing when no adjustment is made on timing.
Figure 9:
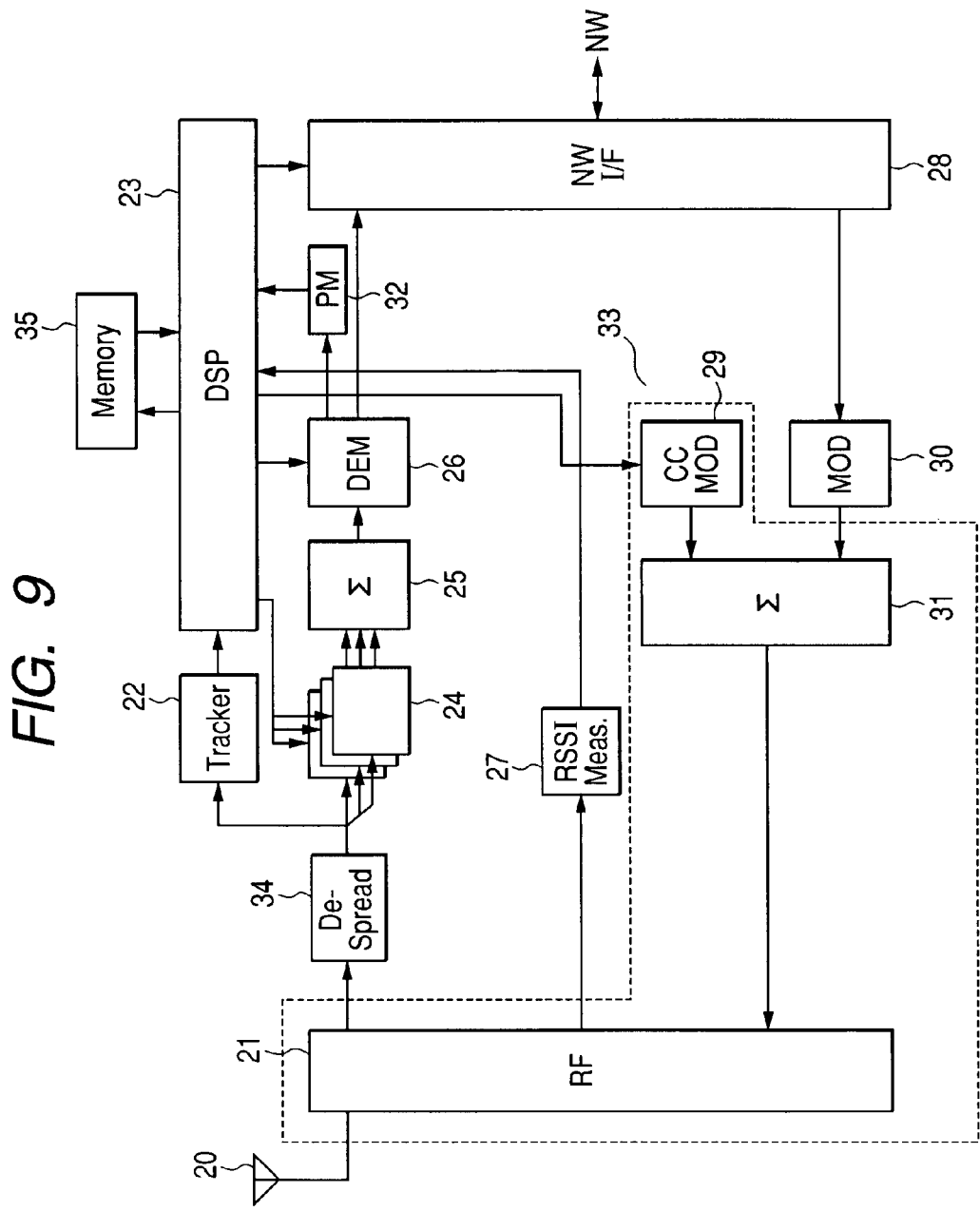
FIG. 9 is a block diagram of a base station apparatus for the respective load balancing methods according to the second and third embodiments of the invention.

FIG. 9 shows a configuration of a base station apparatus according to the present embodiment. The base station apparatus can adopts the same configuration as that shown in FIG. 8. The former differs from the latter only in that a signal processor DSP (23) keeps track of varying states of signal reception power by the interlace through statistical processing, thereby generating control information indicating that other interlaces are unoccupied, besides RABs described with reference to the first embodiment. This is achieved by storing the states of signal reception power by the interlace in a signal reception power information storing memory (35), and by comparing signal reception power information worked out in a relevant interlace with stored information on the varying states of the signal reception power by the interlace. For example, in the case of the wireless frame consisting of three interlaces, as shown in FIG. 1, it is assumed that 2 bits of information is generated, and an information block corresponding to a first bit indicates that a sub-frame preceding a relevant sub-frame is unoccupied while an information block corresponding to a second bit indicates that a sub-frame following the relevant sub-frame is unoccupied. If the information block is transmitted by lowering a coding ratio, for example, with the use of one of the sub-frames, this will enable the information to be transmitted while reducing power consumption for transfer of the information.

Figure 11:
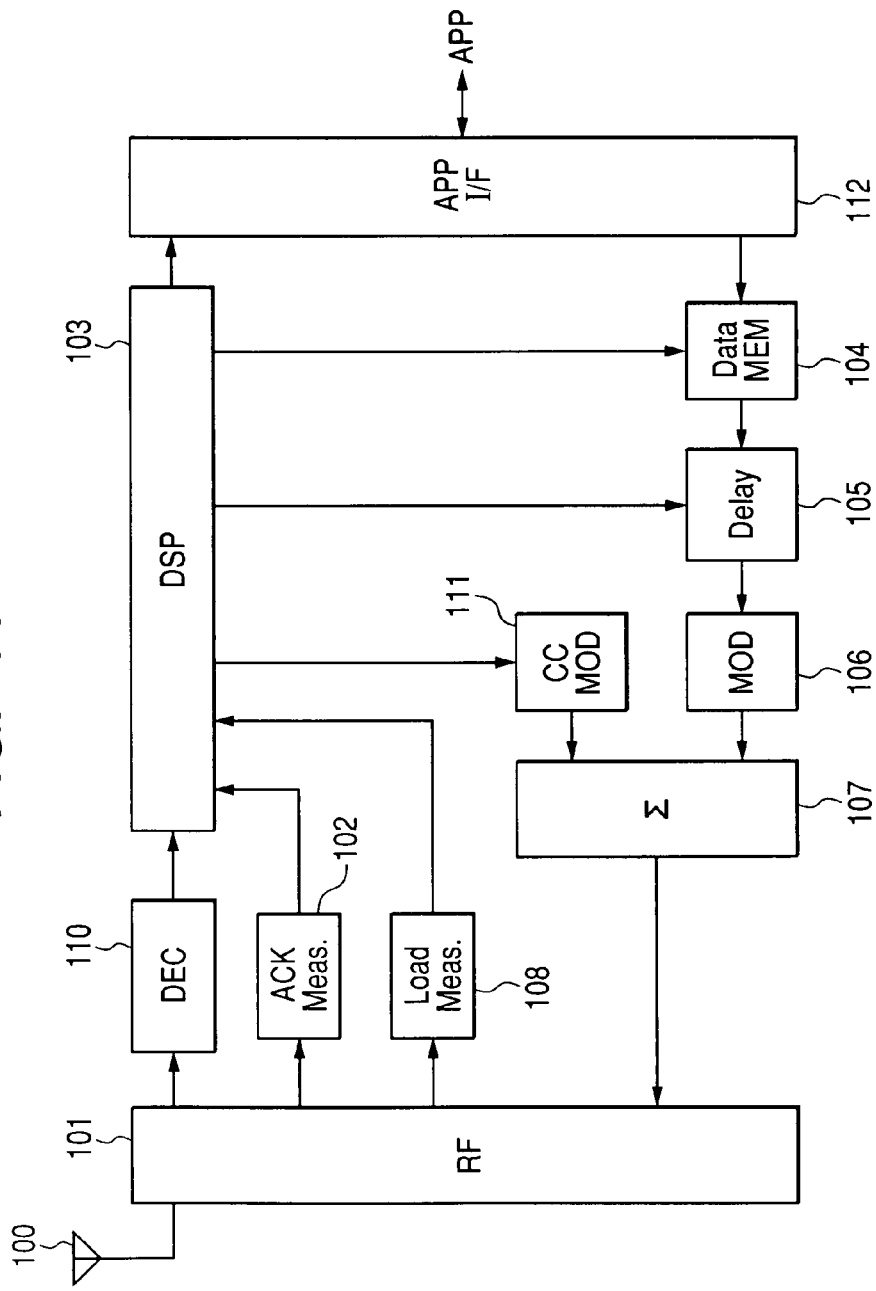
FIG. 11 is a block diagram of a terminal for the load balancing method according to the second embodiment of the invention.

FIG. 11 shows a configuration of a terminal according to the present embodiment. The terminal can adopts the same configuration as that shown in FIG. 10. The former differs from the latter only in that load information on an interlace-by-interlace basis, generated and managed on the part of terminal in the case of the first embodiment, is notified by the base station. This can be implemented if a load information measurement unit (108) takes measurements on the load information on an interlace-by-interlace basis, and input the same to a signal processor DSP (103). In this case, there is no need for the load information memory (109).

Since the terminal determines as described in the foregoing based on the RAB information and the notified information 502, transmitted by the base station, and is capable of starting transmission after selecting an interlace with a low load, load decentralization on an interlace-by-interlace basis can be autonomously executed, so that control can be effected such that a capacity of the system is maximized. Hence, the problem described is resolved. In contrast to the first embodiment, the base station examines a load on an interlace-by-interlace basis, and notifies the same to the terminal, so that the terminals each need not have a mechanism for performing such an operation. Furthermore, the present embodiment has an advantage in that an interlace to be guided by the base station can be controlled with greater ease.

Third Embodiment

Figure 7:
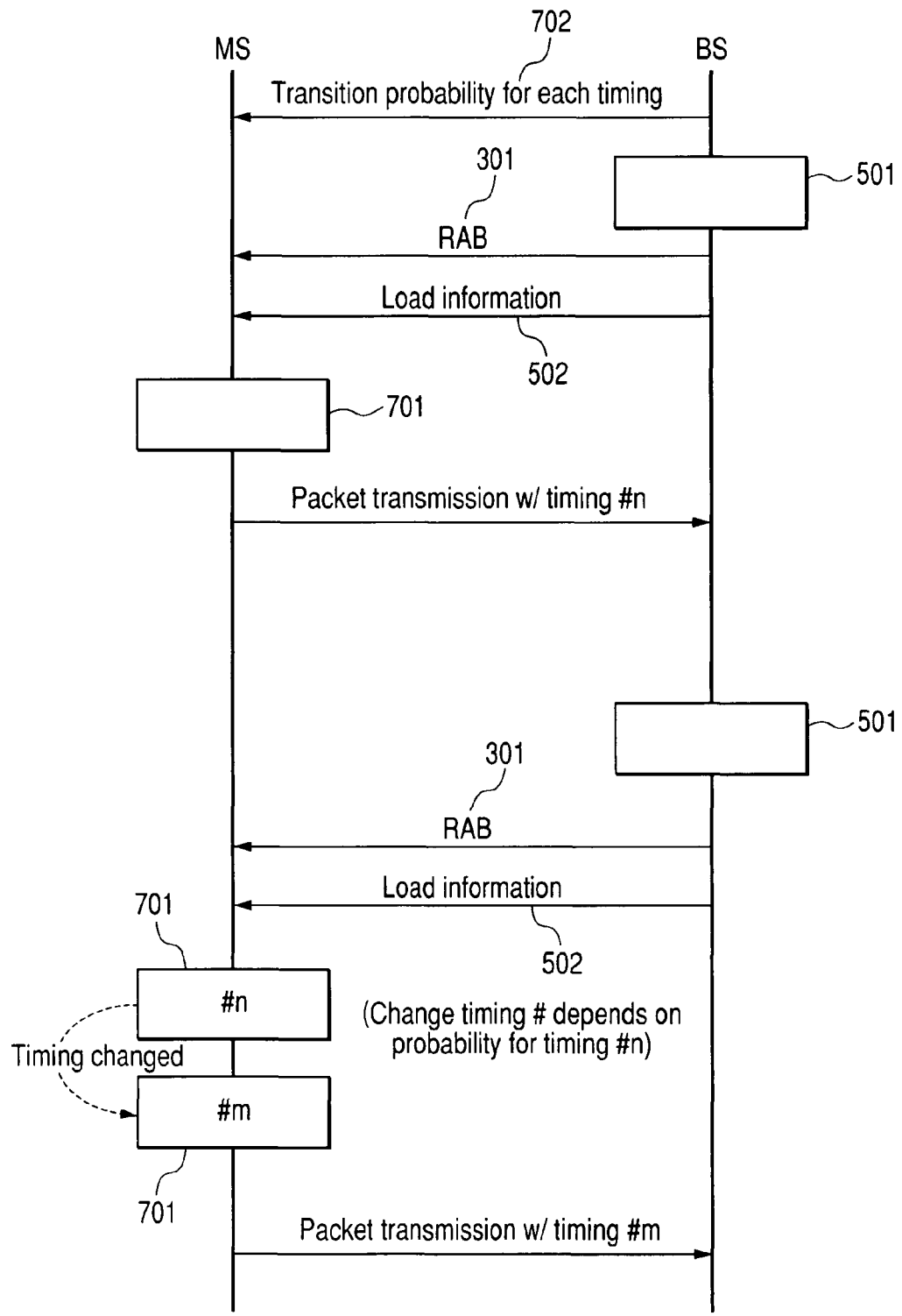
FIG. 7 is a diagram showing control sequence of a load balancing method according to a third embodiment of the invention.

In FIG. 7, there is shown control sequence of a load balancing method according to a third embodiment of the invention. Respective operations 301, 501, 502 are the same as those according to the load balancing method according to the second embodiment of the invention. With the present embodiment, information (702) on probability of transition between interlaces has been designated by a base station beforehand, and a terminal executes interlace transition according to such designation. For example, when RAB 301 is at "1", the terminal generates a random number at adequate timing, and the value of the random number is compared with a predetermined threshold, whereupon if a specified condition is met, another interlace is selected (701), and communication is continued after changing over thereto. By so doing, it is possible to prevent shift to another interlace in unison from occurring at a multitude of terminals. The scope of the invention includes also a method whereby a terminal is caused to determine which other interlace is unoccupied at this point in time without the use of the notified information 502 as is the case of the first embodiment.

As shown in FIG. 7, observation on the RAB 301, and the notified information 502 may be continued even while packets are being transmitted, and when it is determined based on measurement results that there exists an interlace lower in load than an interlace presently in use for communication, transmission timing may be shifted on a probabilistic basis. There is a possibility that a packet can be transmitted to the interlace lower in load by so doing. The base station always estimates the possibility of a packet coming to any of all the interlaces, and keeps standing by, so that even if the terminal on its own decision changes the interlace to which a packet is transmitted without any particular reporting, the base station is capable of correctly receiving the packet. Further, the scope of the invention also includes a method whereby a threshold of control by probability is changed on an interlace-by-interlace basis as shown in FIG. 7. In particular, if a transition probability (702) is changed according to the kind of QoS management, such as VoIP, Best Effort, and so forth, this will enable a specific application to be preferentially allocated to a specific interlace. For example, if the transition probability at a interlace is rendered lower in relation to other interlaces for VoIP, and higher in relation to those other interlaces for Best Effort, only VoIP is prone to easily converge at the interlace. By so doing, it becomes easier to execute admission control for controlling capacity by causing VoIP to be converged at a specified interlace.

When putting such a technology as described into practice, it is preferable that a procedure is available whereby respective thresholds for the control by probability can be changed from the base station. Accordingly, the base station is capable of transmitting parameters (702) for the control by probability, as control information, by use of the control channel transmitter 33 in FIG. 8. The parameters may be designated by an operator connected to the network.

Figure 12:
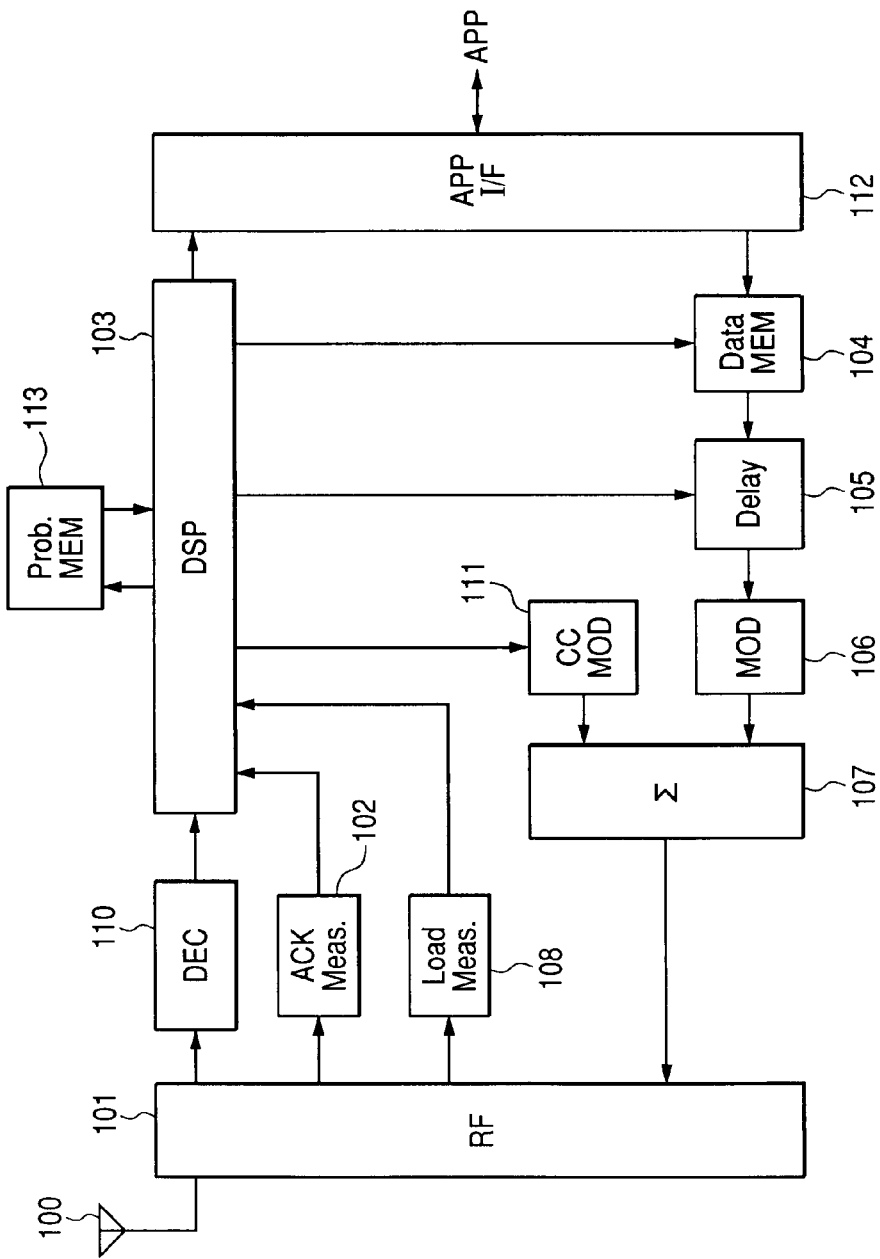
FIG. 12 is a block diagram of a terminal for the load balancing method according to the third embodiment of the invention.

FIG. 12 shows a configuration of a terminal according to the present embodiment. The terminal can adopts the same configuration as that shown in FIG. 11. The former differs from the latter only in that when a condition for changing transmission timing is met, the terminal executes a change according to the transition probability corresponding to the interlace•service thereof. This can be implemented if transition probabilities notified from the base station by the service, and by the interlace, respectively, are stored in a transition probability information storing memory (113), and if determination is made on whether or not the transmission timing should be changed according to transition probability information as read out from the transition probability information storing memory 113 when a signal processor DSP 103 determines that a transition condition has been met.

As described in the foregoing, based on the RAB information and the notified information 502, transmitted by the base station, and by use of a probabilistic control method, sequential transition between interlaces is carried out at the terminal. In consequence, packet transmission is executed by selecting an interlace with a low load, so that load decentralization on an interlace-by-interlace basis can be autonomously executed. Accordingly, control can be effected such that a capacity of the system is maximized. Hence, the problem described is resolved. Since the autonomous decentralized control employing the transition probability is executed, the control can become more stable as compared with the second embodiment. Furthermore, the present embodiment has an advantage in that it is possible to provide a transition probability differential between the services.

With the invention, in the case of cellular communications based on CDMA, in particular, load decentralization between interlaces can be easily implemented, thereby maximizing a system capacity.

What is claimed is:

1. A wireless communications system comprising:
    a base station; and
    a plurality of terminals, respective terminals communicating with the base station by means of interlacing for cyclically using a sub-frame to be subjected to time division multiplex,
    wherein the base station is configured to notify a respective terminal of load information due to communication between the base station and the terminal, determine at predetermined cycles in the predetermined cycles of a unit of the sub-frame, or shorter than that while the terminal determines load information by the sub-frame based on the load information notified by the base station, thereby selecting an interlace to be used for communication with the base station before communication is executed,
    wherein the terminal is configured to keep track of the load state at the base station on an interlace-by-interlace basis based on Reverse Activity Bit (RAB) that is generated based on instantaneous values of the measurement results information notified by the base station, and the terminal changes transmission timing according to transition probability information to an interlace that is low in load.

2. The wireless communications system according to claim 1, wherein the base station notifies the terminal of peripheral interlace information indicating an interlace load state, other than that at the respective predetermined cycles, together with the load information notified by the base station at the predetermined cycles while the terminal selects an interlace to be used for communication with the base station based on the load information notified by the base station at the predetermined cycles, and the peripheral interlace information, before communication is executed.

3. The wireless communications system according to claim 1, wherein the terminal selects an interlace to be used for communication with the base station at the start of the communication with the base station, or in the middle of the communication.

4. The wireless communications system according to claim 1, wherein if the terminal detects based on the load information notified by the base station that a load of an interlace in use is high in the middle of communication with the base station, the terminal carries out a change to another interlace according to a predetermined probability, thereby continuing the communication.

5. The wireless communications system according to claim 4, wherein the predetermined probability is set a value varying according to QoS of the communication executed by the terminal, or an application.

6. A wireless communications system according to claim 1, wherein the load information is generated by the base station based on signal reception power from the terminal, as measured at the respective predetermined cycles.

7. A base station apparatus in a wireless communications system comprising a base station, and a plurality of terminals, respective terminals communicating with the base station by each terminal comprising means for interlacing to cyclically use a sub-frame to be subjected to time division multiplex, said base station apparatus comprising:

a measurement unit for determining load information due to communication between the base station and the terminal in predetermined cycles of a unit of the sub-frame, or shorter than that;

a load information comparator for deciding a load state by the interlace based on the load information as determined; and a wireless communication unit configured to notify a respective terminal at the predetermined cycles of the load information in the predetermined cycles, and peripheral interlace information indicating an interlace load state, other than that at the respective predetermined cycles, wherein the respective terminal is configured to keep track of the load state at the base station on an interlace-by-interlace basis in response to a Reverse Activity Bit (RAB) generated based on instantaneous values of the measurement results information notified by the base station, and to change transmission timing according to transition probability information to an interlace that is low in load.

8. The base station apparatus according to claim 7, wherein the wireless communication unit is capable of notifying a probability of transition to another interlace based on the load state by the interlace.

9. A terminal in a wireless communications system comprising a base station, and a plurality of terminals, respective terminals communicating with the base station by means for interlacing for cyclically using a sub-frame to be subjected to time division multiplexing, said terminal comprising:

a load information measurement unit configured to detect and keep track of a load state at the base station on an interlace-by-interlace basis based on Reverse Activity Bit (RAB) that is generated based on instantaneous values of the measurement results information notified by the base station;

a signal processor for comparing the load information of an interlace with that of another interlace, thereby deciding whether or not transmission timing should be changed based on transition probability information to an interlace low in load; and a delay device used for changing the transmission timing.

10. The terminal according to claim 9, further comprising a transition probability information storing memory for storing transition probabilities, as specified and notified by the interlace and by the service, respectively, and a signal processor for deciding whether or not transmission timing should be changed according to the transition probabilities.

11. A base station apparatus in a wireless communications system for communicating terminals by means of interlacing for cyclically using a sub-frame to be subjected to time division multiplex, said base station apparatus comprising:

a measurement unit is configured to determine load information due to communication between the base station and the terminal in predetermined cycles of a unit of the sub-frame, or shorter than that, and generates a Reverse Activity Bit (RAB) based on instantaneous values of the measurement results information;

a load information comparator is configured to decide a load state by the interlace based on the load information as determined; and a wireless communication unit is configured to notify the terminal at the predetermined cycles of the load information in the predetermined cycles, and peripheral interlace information indicating an interlace load state, other than that at respective the predetermined cycles, the load information includes the RAB, wherein the terminal is configured to keep track of the load state at the base station on an interlace-by-interlace basis in response to RAB in the load information, and the wireless communication unit is further configured to change transmission timing according to transition probability information to an interlace that is low in load.

* * * * *